United States Patent

Twyford

[15] 3,702,987

[45] Nov. 14, 1972

[54] INFORMATION VERIFICATION SYSTEM AND DIGITAL DATA INPUT UNIT

[72] Inventor: Robert H. Twyford, Falls Church, Va.

[73] Assignee: Ultronic Systems Corp.

[22] Filed: July 24, 1970

[21] Appl. No.: 64,862

Related U.S. Application Data

[62] Division of Ser. No. 721,543, March 15, 1968, Pat. No. 3,569,624.

[52] U.S. Cl. ............................ 340/172.5, 235/145 R

[51] Int. Cl. ............................ G06f 3/04, G06f 15/30

[58] Field of Search ......... 340/172.5; 235/157, 145 R

[56] References Cited

UNITED STATES PATENTS

| | | | |
|---|---|---|---|
| 3,308,439 | 3/1967 | Tink et al. | 340/172.5 |
| 3,407,387 | 10/1968 | Looschen et al. | 340/172.5 |
| 3,281,789 | 10/1966 | Willcox et al | 340/172.5 |
| 3,323,119 | 5/1967 | Barcomb et al. | 340/172.5 |
| 3,344,401 | 9/1967 | MacDonald et al. | 340/172.5 |
| 3,297,994 | 1/1967 | Klein | 340/172.5 |
| 3,321,135 | 5/1967 | Englund et al. | 235/145 R |
| 3,593,311 | 7/1971 | Caldwell | 340/172.5 |

*Primary Examiner*—Paul J. Henon
*Assistant Examiner*—Mark Edward Nusbaum
*Attorney*—Norman J. O'Malley and Theodore C. Jay, Jr.

[57] ABSTRACT

A system incorporating the storage of information and the capacity of retrieval from such storage of selected information data. Typically, the system is used for verification of acceptable credit account ratings for customers of a credit accepting merchandising operation. The system uses digital computer techniques in which coded signals from any one of a plurality of inquiry units can act as a command on the formation storage unit to search and report back to the requesting inquiry unit the presence or absence of informative data in the storage unit corresponding to that requested to be checked by the inquiry unit.

7 Claims, 22 Drawing Figures

INVENTOR

Robert H. Twyford

INVENTOR
Robert H. Twyford

INVENTOR

Robert H. Twyford

INVENTOR
Robert H. Twyford

INVENTOR
Robert H. Twyford

INVENTOR

Robert H. Twyford

INVENTOR
Robert H. Twyford

INVENTOR

Robert H. Twyford

INFORMATION VERIFICATION SYSTEM AND DIGITAL DATA INPUT UNIT

CROSS REFERENCE TO RELATED APPLICATIONS

This application is a division of application Ser. No. 721,543 filed Mar. 15, 1968, now U.S. Pat. No. 3,569,624.

This invention relates to a system for selectively checking from a plurality of remote locations information accumulated at a central location and to an input unit usable in such a system or for supplying informative data to digital data utilizing equipment.

The system of the instant invention may be generally classified as incorporating information storage and the capacity of retrieval from such storage of selected informative data. The system employs digital computer techniques wherein coded signals from any one of a plurality of inquiry units can act as a command on the information storage unit to search and report back to the requesting inquiry unit the presence or absence of informative data in the storage unit corresponding to that requested to be checked by the inquiry unit.

A particular application of the instant invention herein may be described and will be used hereinafter to exemplify one application for the system, namely, verification of acceptable credit account ratings for customers of a credit accepting merchandising operation.

It is quite common in large retail operations such as department stores for the customers' accounts where credit is extended by the store to be identified by multiple digit numbers frequently associated with the customer's name and address on credit plates or cards which are issued to the customers. The multiple digit number identifying the customer's account is employed as a convenience by the sales clerk in checking or verifying the property of extending credit to the customer when a purchase is made.

The verification of a customer's acceptable credit status at the time of purchase has most usually involved the necessity of the sales clerk telephoning a control credit office where an individual will check the account status and report its being in good standing or that credit cannot be extended on the particular account being checked. This telephone checking technique not only involves waste of time of the clerk and waiting customer, but also necessitates a substantial staff in the central credit office available to check and reply to each clerk calling for credit verification. The substantial manpower requirements in a large department store with hundreds of selling points throughout the store is self-evident.

Within the operations of the central credit office in a large merchandising facility, it is common for the credit manager or his assistants to evaluate those customers' accounts where payments have been unreasonably slow or excessive credit purchases accumulated and from this evaluation conclude whether or not extending further credit should be authorized. From the possible hundreds of thousands of accounts for a large department store, a limited number of such accounts may be determined as poor further credit risks and these customers' accounts thereupon placed on a "negative list." This "negative list" may well change in the account numbers included thereon from day to day and is the list checked by personnel in the central credit office in response to telephone inquiries from the respective sales clerks at the points of sale.

In application of the information checking system invention herein to a customer credit verification installation for a large retail operation, the telephone authorization practice as outlined hereinabove is alleviated and a minimum time period required for verification by the sales clerk of the particular customer's account being valid for credit in purchase of the items desired by the customer. The system not only permits very rapid examination of the current "negative list" of customer's accounts but also alleviates the need for a substantial clerical staff in the central credit office to receive the inquiries from each clerk, check the "negative list" and reply concerning the clerk's inquiry. Further the system as applied to a customer's credit verification enables immediate addition or removal of customer account numbers for the "negative list" carried out by authorized personnel at the central credit office such that the "negative list" of customer accounts may be maintained current up to the minute during store selling hours. An account when determined by the credit manager or his assistants as no longer justifying credit, may be instantly added. The account number of a customer whose actions justify its removal from the "negative list" may be instantly removed and this customer immediately enabled to make credit purchases throughout the store.

The information checking system when adapted to credit verification use may also incorporate a safety feature to insure compliance with the retail facility's policy of requiring the sales clerk to check a customer's account each and every time a charge purchase is to be made. This feature described in the specific application hereinafter set forth, contemplates a validating code signal being determined at the central information storing unit by authorized personnel such as the credit manager or his assistants having access to such central unit. This validating code signal is variable at the option of such authorized personnel and preferably would be dependent on selected digits of the multi digit account number and variable from day to day in a random fashion. This validating code signal is employed by such signal being transmitted from the information storing unit along with the response to the request made by the inquiry unit by a sales clerk at the point of sale. The validating code signal is displayed on the inquiry unit and the clerk enters the displayed validating code signal on the sales check. Thereby each sales check would receive indication thereon by the sales clerk of the current validating code signal and thus the sales check would be available to confirm that the sales clerk had complied with the store policy and checked the customer's account acceptability concurrently with permitting the credit purchase to be made.

Aside from the specific application for the information checking system described above, it will be appreciated that this system can easily be adapted to a variety of other uses in which a plurality of remote points or locations have need to make periodic inquiry with respect to information accumulated at a central location, which information is subject to frequent change. For example, in a warehousing facility containing a multitude of parts or articles distinguishable by assigned multi digit numbers, the system may be effectively employed such that a number of clerks or other personnel remote from the warehouse storage of the parts or articles may from time to time as the need arises, immediately determine the exact current stock status in the warehouse. In banking operations the information checking system may be effectively employed to immediately ascertain the customer's account status incident payment on a check sought to be cashed and drawn on the customer's account.

In retail store credit account verification or in an application in a banking operation, the multi digit number inserted in the inquiry unit and employed at the central information storing unit to check its presence or absence among the accumulated stored information may in addition to the digits making up the number identifying the customer's account have added thereto appropriate digits reflecting the dollar amount of the desired credit purchase or check to be cashed. With this added information in the multi digit number inserted at the inquiry unit and searched at the central information storing unit, the response displayed at the inquiry unit to the store clerk or bank teller may also verify the acceptability of the magnitude of credit to be extended or the amount of cash to be presented for the check.

The system of the instant invention will be recognized as not only having ideal applicability to installations where the plurality of remote locations relative to the central information storing unit at which inquiry units are located are all within the same building but also where the remote locations and remote inquiry units are in branch stores or banks relative to the central storing unit disposed in the credit office of the main store or principal office of the bank. The branch stores may even be in different cities from the city of the main store and communications between the inquiry units and the central information storing unit carried out by standard telephone data transmitting units. For this purpose, two leased telephone lines such as the standard message class lines now frequently used for communication between branch stores and a main store, may conveniently be employed.

The inquiry unit employed with the information checking system outlined hereinabove has special independent utility as a unit apart from such system. This component is effectively usable as an input unit for supplying informative numerical data to data utilizing equipment. It may thus function as a computer input device in applications which require a multiplicity of simultaneous manual inputs. It meets the requirements of providing a low cost displayed input to digital equipment and can effectively replace banks of thumb wheel switches or expensive combinations of display and keyboard assemblies while eliminating the need for costly electronic input registers.

The input unit whether employed for selectively checking accumulated information in systems as described heretofore, or used to supply informative numerical data to digital equipment embodies a number of unique and advantageous features.

Incident manual insertion of the multi digit number into the input unit, immediate visual display of the number inserted is provided thereby enabling the operator to recheck the number prior to requesting a search for the number at the central information storing unit or entry of the number into the digital equipment. Once inserted and visually displayed, the multi digit number is mechanically stored in the input unit. Thereafter the operator by pressing a sending key effects, depending upon the connections of the unit to the information storage unit or the digital equipment, direct forwarding of signals representative of the multi digit number or signals the storing unit or digital equipment of the input unit's readiness to forward the number's representative signals and waits for receipt of an enabling signal before transmitting the digital signals representing the multidigit number.

Once the digital signals for the multidigit number have been sent, the input unit resets the visual display of the multi digit number returning the input unit to a normal standby position in readiness for insertion into the unit of the next multi digit number.

The above and other more specific advantages and features of the instant invention, including more specific structural characteristics of the input unit, will be made readily apparent by reference to the accompanying drawings in which a preferred embodiment is disclosed by way of example, various modifications and details thereof being contemplated within the scope of the appended claims. The information checking system and particularly the inquiry unit usable with such system and more broadly usable as a numerical data input unit, are illustrated on the accompanying drawings in which:

Initially, description of the input unit shown on FIG. 1 and usable as an inquiry unit at the check stations of the information checking system shown on FIG. 2 will be described as to its general external features and functioning. Thereafter the use of a plurality of these units as remote inquiry units in an information checking system and with minor variations, as a control unit at a control station for the system will be described with reference to FIG. 2. Thereafter, the internal structural features and details of the input unit and their advantages whether the unit be used in an information checking system or for numerical data input to digital equipment will be described with reference to the remaining figures on the drawings.

Figure 1:
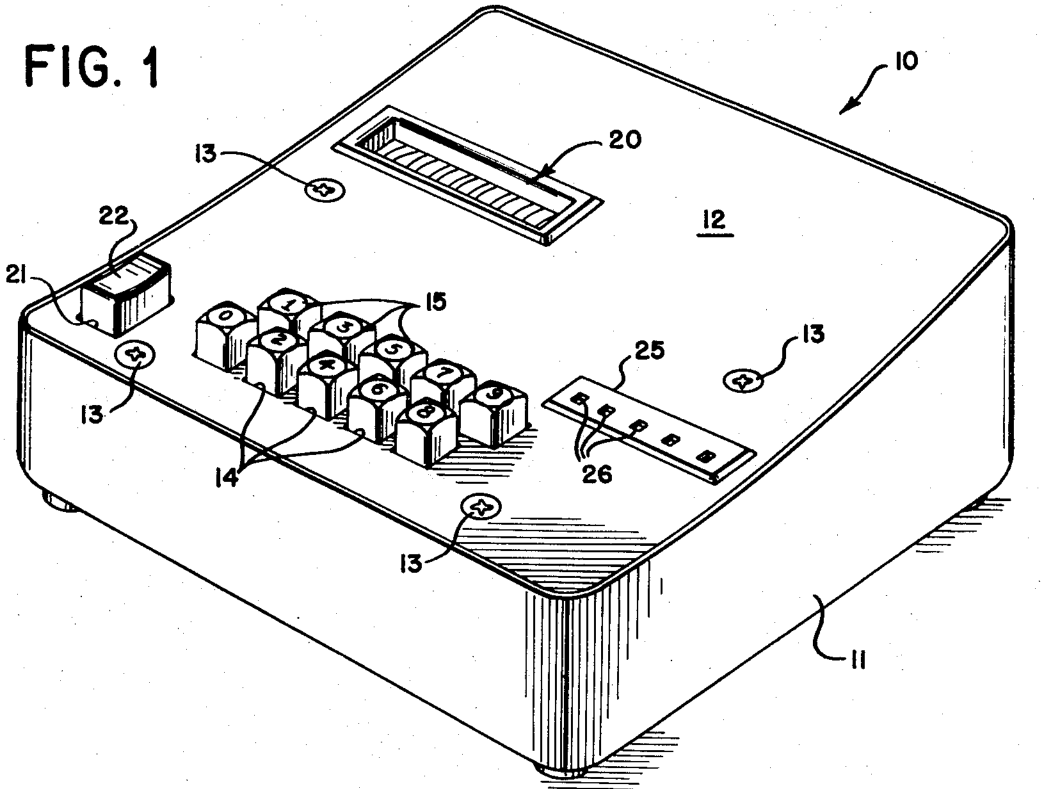
FIG. 1 is a perspective view of the exterior of an input unit usable as an inquiry unit in an information checking system.
Figure 17:
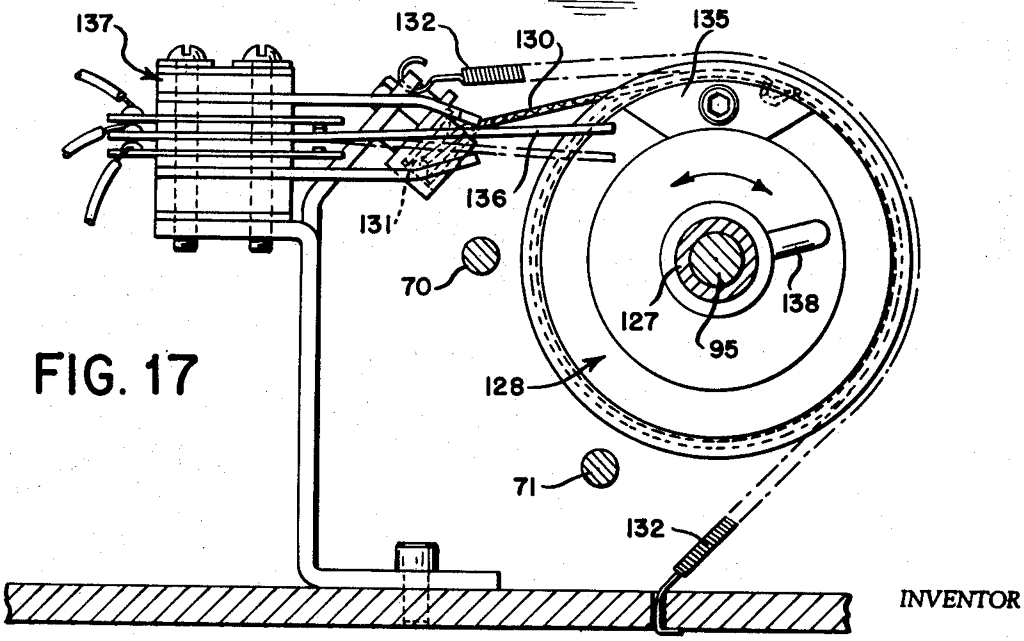
FIG. 17 is a view taken on line 17—17 of FIG. 15.

Input unit 10 is made up, as illustrated on FIG. 1, of a housing 11 forming the bottom and four side walls enclosing the parts within the unit. A removable cover 12 is suitable secured in place by screws 13 closes the open upper end of housing 11.

Cover 12 is provided with a group of ten appropriately spaced openings 14 through which pass ten number keys 15, these keys individually representing the digits 0 through 9, respectively. The digit which each number key represents is appropriately reflected by such number being imprinted on the upper end of the key.

The cover 12 also carries a display window 20 which may be appropriately provided with transparent material to exclude dust and foreign matter from entering the input unit housing. In the assembled position of the cover 12 on housing 11, the display window 20 overlies a series of digit display wheels rotatable about a common axis within the housing and each wheel bearing the digits 0 through 9 individually spaced on the circumference of the wheel. In the inactive condition of the input unit, the digit display wheels are at rest in a normal standby position common to all wheels where at no numbers are visable through display window 20. When the multi digit number information is inserted into the unit 10 the wheels are rotated and stopped to display through window 20 the multi digit number that has been inserted.

Cover 12 also is provided with an aperture 21 through which passes a sending key 22. This key is depressable as will be explained in conjunction with the internal parts of unit 10 to transmit from the unit, digital signals representative of the multidigit number inserted into the unit. Incident depression of sending key 22, the digit display wheels are reset to their normal standby position whereat no numbers are visable through display window 20.

Additionally, cover 12 carries an escutcheon 25 which, as illustrated, is provided with five indicator ports 26. An illuminating lamp is mounted beneath each port 26 to report when input unit 10 is used in an information checking system, the results of the check that has been made of the central information storing unit on the data requested. As one example of the function of the ports 26, the lamp for one port may be illuminated continuously when operating power is supplied to the information checking system to indicate that the system is in operating condition. A second port may be illuminated or remain dark depending upon the presence or absence of the data checked at the central information storing unit. The other three ports may be illuminated or remain dark in various combinations of these three ports to represent the current validating code signal that has been sent from the central information storing unit and may be employed as mentioned hereinabove to confirm that check of the credit account number has been made by the store clerk incident extending credit on a customer's purchase.

Before undertaking a description of the parts and their working on the interior of the input unit 10 in FIG. 1, description will be given with reference to the diagrammatic view of FIG. 2 of the overall operation and interconnection of a plurality of input units 10 connected as inquiry units and a control unit in an information checking station.

Figure 2:
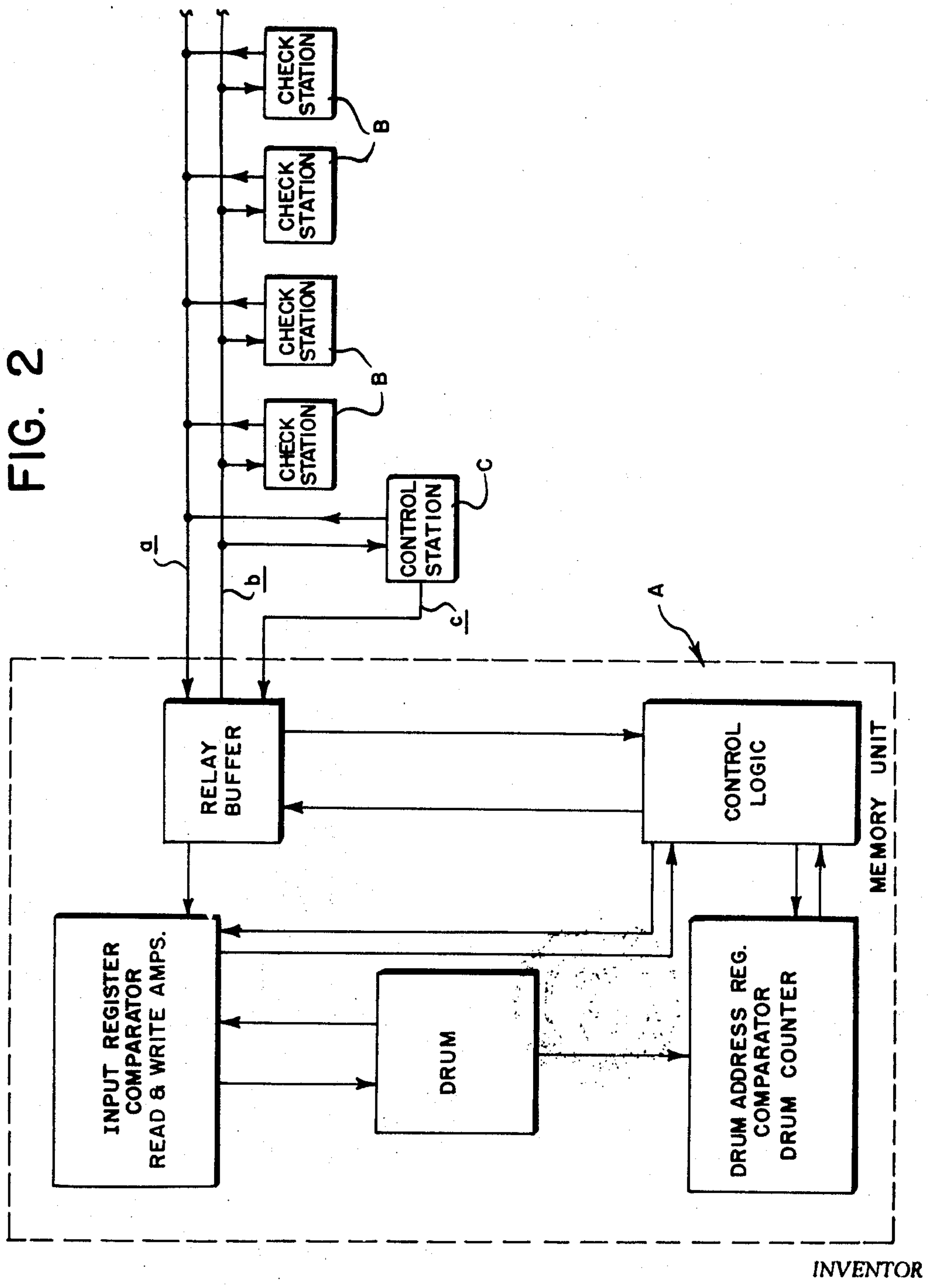
FIG. 2 is a schematic block diagram illustrating the connections in an information checking system for a plurality of remote inquiry units at check stations, a control unit at a control station and a central information storage unit as a memory unit.

In the system of FIG. 2, a memory unit A forming a central information storing unit is provided to retain the accumulated information which is to be the subject of periodic check from one or another of several check stations B, four such check stations being illustrated on FIG. 2. Each check station B will have a remote inquiry unit along the lines of the unit 10 of FIG. 1. It will be understood that the number of check stations and consequently the number of inquiry units will be determined by the number of locations at which a person such as a sales clerk or bank teller may be located and have the need for making inquiry to the central information storing unit. The memory unit A forming the storing unit will be appropriately located at the central credit office of the store or central account office of the bank.

Speaking of the adaptation of the system to credit account verification such as needed in a department store, an inquiry unit 10 will be placed readily available to the store clerk at the point of sale. Upon a customer requesting a credit purchase the clerk will observe the illumination of the power-on indicator light to confirm that the system is in readiness for operation. Then the credit card number for such customer's account will be inserted into the inquiry unit by successively depressing the appropriate number keys 15 to collectively make up the multi digit credit card number. When the last number key for the last digit of the number is pressed, the digit display wheels visible through display window 20 will rotate and the series of wheels individually stopped to display through window 20 the inserted number for the customer's credit card. At this point the clerk may conveniently compare the credit card number with the multi digit number displayed in window 20 and verify the accuracy of the clerk's insertion of the digits making up the number by depression of the proper number keys 15.

After comparing the multi digit number displayed in window 20 with the credit card number, the clerk will depress sending key 22. In the preferred operation of the system, this will condition inquiry unit 10 to transmit digital signals representing the multi digit number now displayed in window 20. However, such signals will not be transmitted until an enabling signal unique to the particular inquiry unit being operated has been received by such inquiry unit from the central information storing unit or memory unit A.

As one feature of memory unit A, this unit incorporates sending means which transmits in continuous succession a series of enabling signals, the series including a signal unique to each of the inquiry units connected into the system. When a particular inquiry unit is operated to request a check of the information accumulated in the central information storing unit and thereafter detects in the series of enabling signals the signal unique to such inquiry unit, the unit commences transmission of the digital signals representing the multi digit number inserted into the unit. Also, at this time the one inquiry unit that is transmitting to the storing unit signals the storing unit to cease sending of the enabling signals such that all other inquiry units at the various check stations B are disabled from transmitting digital signals even though the clerk at one or another of these check stations may be in the process of requesting check of another customer's credit account. When the first inquiry station has its request for check of the accumulated information answered, the sending of the succession of enabling signals from the storing unit will resume and the next inquiry unit detecting the enabling signal unique to it will respond by transmitting digital signals for the multi digit number inserted thereinto and all other inquiry units will be prevented from transmitting until the second request for information check has been completed.

The enabling signal may be transmitted from memory unit A over the lines collectively designated *a* on FIG. 2 with the inquiry unit at each check station B incorporating therein a decoding network which will respond to detection of its unique enabling system and trigger it into operation to transmit its digital signals back over lines *a* and block all other inquiry units at the inquiry stations B from interferring with this first inquiry unit's request for check of the information at memory unit A.

The digital signals representative of the multi digit number inserted into the inquiry unit pass through the lines *a* into memory unit A to a relay buffer. The signals, as will become more apparent from the description of the input unit 10 given hereinafter, in the system as contemplated will enter the relay buffer to 10 relays through 10 wires included among lines *a*. This contemplates a system to accommodate a nine digit number to be checked, with one wire being provided to carry a timing signal such that the digital code for the nine digit number may be properly received and interpreted within memory unit A.

In the system of this invention and in the input unit 10 the digital signals are made up from a binary code. Each digit from 0 through 9 is assigned a specific combination of absence or presence of a pulse with four information bits being used to identify a single digit. For example, in the input unit as disclosed, the following assignment of four bit codes for the digits 0 through 9 is contemplated with 0 meaning the absence of a pulse and 1 meaning the presence of a pulse.

| Digit | Code |
|---|---|
| 0 | 0000 |
| 1 | 1000 |
| 2 | 0100 |
| 3 | 1010 |
| 4 | 0101 |
| 5 | 0010 |
| 6 | 1001 |
| 7 | 1100 |
| 8 | 0110 |
| 9 | 0011 |

A timing signal is transmitted over a separate wire from the inquiry unit, this timing signal being made up of a trigger pulse transmitted at the end of each of the four bits in the four bit code.

The relays in the relay buffer serve to clean up any irregularities in the signals received from the inquiry unit and pass on more precisely defined signals to the input register. The input register employs 36 flip-flops to receive the signals, i.e., four signal bits for each of the nine digits making up the multi digit credit card number. The timing signal also transmitted from the relay buffer, operates the flip flops in sequence to therby introduce into the input register intelligible information depicting the particular nine digit number originally inserted in the inquiry unit.

This information is then introduced to the magnetic information storage drum through a series of 36 magnetic detecting heads and the drum rotated a minimum of one revolution to search the drum surface for corresponding information which would indicate the presence on the drum of information depicting the particular multi digit credit card number to be checked as requested at the inquiry unit.

Upon comparison of the information introduced to the input register with the magnetized and unmagnetized information stored on the drum, the determination of a matching of the information is relayed to the drum address register and through the control logic in the memory unit sent back through the relay buffer and through lines *b*. These lines will inform the particular inquiry station which is on the line by reason of its having detected its unique enabling signal, lighting one of the ports on the inquiry unit to indicate that the particular multi digit number checked has been found in the accumulated information at the storing unit. In a credit account verification system this lighted port will indicate to the store clerk that the account is on the "-negative list" and that credit should not be extended to the requesting customer. Also the lines *b* may transmit the validating code signal whereupon a combination of three of the ports 26 will be illuminated in accordance with the particular validating code currently being transmitted from memory unit A as determined by the code selected by the authorized person in the central credit office.

To add and remove multi digit numbers representative of credit amounts from the information stored in a memory unit A, one or more control stations C will be connected to the memory unit, logically adjacent to such unit and located in the central credit office where access is limited to authorized personnel for changing the negative list of credit accounts stored in the memory unit A. The input unit at control station C is identical in construction internally and externally to the input units employed as inquiry units at each of the check stations B except for the provision on the control unit of a lock controlled switch. Ideally a key lock-type switch will be employed therby enabling the switch to be locked by removal of the locking key and thus limit use of the control station to authorized personnel possessing such lock key.

The lock controlled switch preferrably has three operable positions to which the switch can be turned by use of the lock key. The first position for the switch and the normal position at which the switch would be disposed when the lock key is removed connects the unit with wires in lines *a*. In this condition the control unit disposed at control station C is connected to be operable identically to the operation of any one of the inquiry units at a check station B. In other words, the control unit with the lock switch in this first position may be used by anyone to request check of the information stored in the memory unit as to the presence or absence of a multidigit credit card number among the information accumulated in the memory unit A. This condition for the unit at the control station can be useful when anyone in the credit office has need to check the "negative list" of credit accounts.

The other two positions for the lock controlled switch are employed depending upon whether it is desired to insert a new multi digit number in the information accumulated in the memory unit, thus adding an account number to the "negative list," or remove a multidigit number from the accumulated information and thus take an account off of the "negative list."

Thus the second position will connect the control unit at the control station C to a wire included in lines *c* at which connection a number inserted into the control unit followed by depression of the sending key on this unit will transmit digital signals representing the multidigit number through the wire to the relay buffer and then through the circuitry of memory unit A, scan the drum for the multi digit number to be removed and then remove such number from the drum surface. It follows that after such action any request for check of this particular number from one of the check stations B would result in a report back to the check station that such number is not among the accumulated information and consequently provide an indication that the credit account identified by such number is acceptable for extension of credit.

The third position of the lock controlled switch will connect the control unit at station C to another wire among lines *c*. Through this connection upon inserting a multi digit number into the control unit and then pressing the sending key, the digital signals representative of such number are transmitted to the relay buffer in the memory unit A and these signals appropriately transposed and applied to the drum of the memory unit to enter the number on the drum surface thus including it in the "negative list" of account numbers in the accumulated information stored on the drum. It follows that a request for check of any inquiry unit at a check station B thereafter will get back the report that this number is among the accumulated information giving an indication to the clerk at the point of sale for this check station that the credit account is on the "negative list" and credit should not be extended.

It will be understood that by the provision of the lock controlled switch, appropriately mounted on the cover 12 of the input unit that is used at the control station C, the lock key for this switch may be limited in its accessability to only selected, authorized personnel with a lock switch disposed at the first or normal position when the key is removed and the control unit not in use. At any time when insertion or removal of a number from the stored information is desired, the authorized personnel having access to the key may insert it in the lock controlled switch turning such switch to either the second or third position depending upon whether it is desired to remove an account number from the accumulated information in the memory unit A or enter a number in the accumulated information making up the "negative list" of account numbers.

Having heretofore described functioning of the information checking system as applied, for example, to a credit account number verification installation in a department store, description may now be given of the parts and their functioning in the input unit 10 which is usable at the check stations B or control stations C of the described system. The description of the input unit will make clear the manner in which a multidigit number is inserted into the unit, such number displayed through the window 20 of the unit, the number in the form of digital signals thereafter transmitted from the unit incident depression of the sending key 22 and the report back to such unit represented by illumination of one or more of the ports 26 in escutcheon 25.

Figure 3:
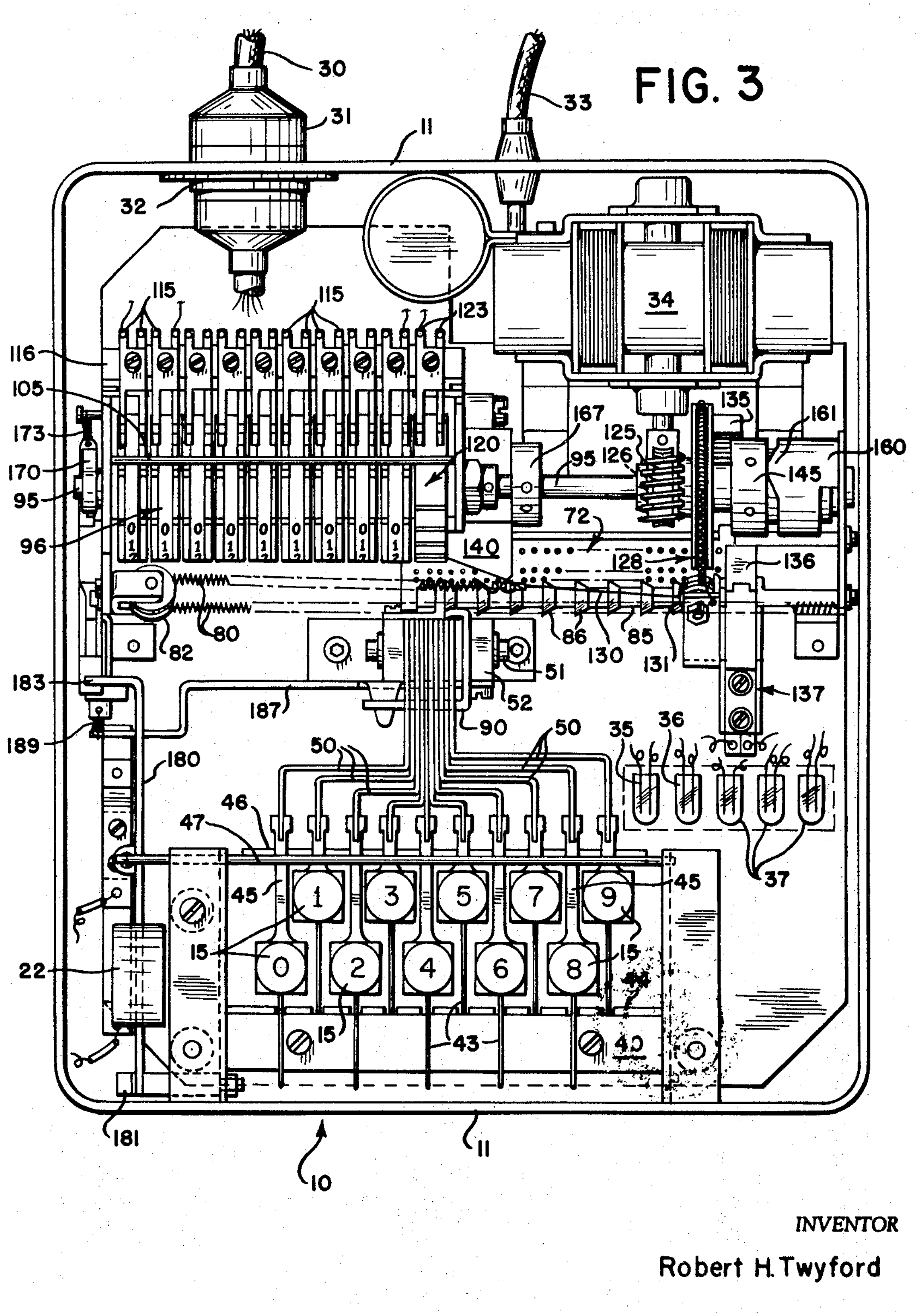
FIG. 3 is a plan view of the input unit of FIG. 1 with the cover thereof removed.

Reference may be made to FIG. 3 which illustrates in plan view a typical input unit 10 disposed within housing 11 with the cover removed from the unit. To facilitate illustration of the structural details, the various wires within the housing interconnecting the driving motor, lamps illuminating ports 26, switches etc., are not shown. Neither are various circuit components within unit 10 illustrated, these components being primarily involved in perfecting or shaping the signal pulses for better transmission and interpretation in the digital equipment or memory unit A with which the input unit may be employed.

A multi wire cable 30 terminating in a plug-in connector 31 is united with a multi pin connector 32 mounted in the rear wall of housing 11. Cable 30 will, of course, contain the requisite number of wires to transmit from and receive information returned to the input unit. When such unit is employed in a system as described hereinabove with respect to FIG. 2 as an inquiry unit, cable 30 then contains wires to make up lines *a* and *b*. Where the unit includes the above-described lock controlled switch and is used as a control unit at a control station in the system of FIG. 2, the cable 30 will in addition include the wires making up lines *c*.

In addition to cable 30, a 110 volt 60 cycle power lead 33 passes through the rear wall of housing 11 being provided at its outer end with an appropriate plug (not shown) to plug the unit into an a.c. power supply. Lead 33 supplies power for a drive motor 34 within the unit.

The five lamps which illuminate the ports 26 in the manner heretofore described with reference to FIG. 1 include lamp 35 which functions as an indicator light to confirm that the central information storing unit or digital equipment with which the input unit is connected is under power and in condition to receive information from the input unit. Lamp 36 in an information checking system is illuminated as indicative of the presence or absence of the stored number in the memory unit. The three lamps 37 are illuminated or remain dark depending upon the particular validating code signal sent from the storing unit along with the reporting signal when the unit is employed in a credit account check system.

Initially, the mounting of the number keys 15 which are depressed to insert the multi digit number into the unit will be described with reference to FIGS. 3 and 4. A platform 40 is mounted within housing 11 beneath cover 12. Pins 41, one for each key 15, are mounted to extend vertically upwardly from platform 40. Each key 15, the body of which may be of plastic, is bored to receive therin a sleeve 42 having an interior diameter to smoothly slide over the exterior of a pin 41. As shown in the sectioned key 15 on FIG. 4, sleeve 42 extends sufficiently beneath the key's lower end such that the bottom of such sleeve acts as a stop limiting downward movement of the key, the key's lowermost stopped position being shown in phantom on this figure.

The forward bottom portion of each key 15 has an upwardly extending bore which receives the upturned end of a bowed wire spring 43 with a downturned end at the opposite end of each spring 43 passing through an aperture in the platform 40. The bowed springs 43 for all of the keys 15 are retained in proper parallel relation extending forwardly from the respective number keys 15 by a slotted wall 44 secured to platform 40.

Each of the number keys 15 carries a horizontally extending arm 45 appropriately fastened to the key by a yoke entering grooves in the side walls of the plastic key. The 10 arms for the respective number keys pass through vertical guide slots formed in the upturned wall 46 forming an upwardly extending continuation of platform 40. A rod 47 is mounted extending across above arms 43 functioning to set the upper limit position for the number keys 15 making up the keyboard.

It will thus be seen that the bowed springs 43 bias the keys to their uppermost position as limited by rod 47 while the lowermost end of sleeves 42 limit the downward extent of depression of the keys 15. The pins 41 on which the sleeves 42 slide guide the keys to traverse a vertical path. It may be pointed out that the upturned end of each spring 43 engaging the forward bottom portion of the key with which it is associated is an advantageous construction in that by applying the biasing force of the spring to this portion of the key such force tends to balance the force which the outer end of the key arm 45 encounters in operating the parts described hereinafter incident insertion of a number into the unit. This counterbalancing action minimizes the possibility of sleeve 42 binding on the pin 41 with which it is slidably associated. Thus a firm key action response is obtained with desired free vertical sliding movement of the key and sleeve 42 relative to pin 41.

The rearwardly extending end of each key supported arm 45 engages in a slot 49 formed in the forward end of a lever 50. There are 10 levers 50, one for each number key. These levers extend rearwardly from the arms 45 with which they are individually associated and, except for one lever which is straight, are bent horizontally and then again horizontally rearwardly to engage as a group over pintle 51. Thus as a number key 15 is depressed, the arm 45 associated with such key will cause the lever 50 with which it engages to rock about the pintle 51. Pintle 51 for the group of 10 levers 50 is horizontally mounted in bracket 52 secured to the base of the unit.

Figures 4, 5, 6:
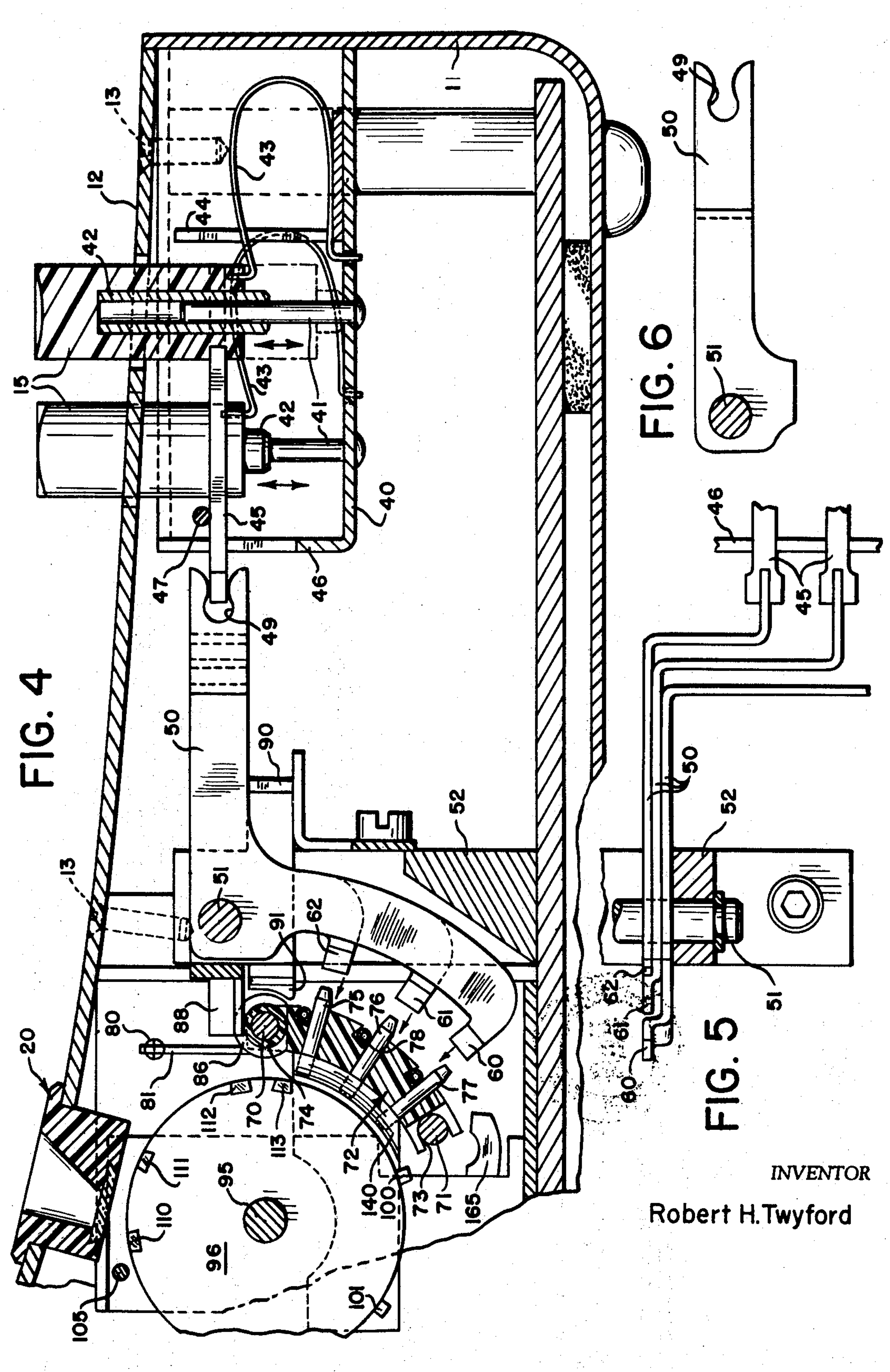
FIG. 4 is a vertical sectional view showing internal parts of the input unit of FIG. 1.
FIG. 5 is a detailed view showing the arrangement of several of the number key actuated levers within the input unit.
FIG. 6 is a side elevational view of the lever actuated by the digit 9 number key.

Each of the slots 49 to receive the end of an arm 45 is formed as best shown in FIGS. 4 and 6. Thus the upper and lower surfaces of the slot are convex so that as the key carrying the arm is depressed, rocking the associated lever 50 downwardly about pintle 51 and thereafter released, these convex surfaces will roll across the upper or lower surface of the arm 45 with which they engage.

Each lever 50 with the exception of the lever for the number key representing the digit 9, is provided at its rearward end with a curved arm extending downwardly and rearwardly beneath pintle 51 as shown in FIG. 4. Each of the downwardly curved arms on a lever 50 has at the lower end thereof an upturned actuating finger. The configuration of the lever 50 operated by depression of the digit 9 number key is shown in FIG. 6. It in effect has no downwardly curved arm or upturned finger such as characteristic of the other levers 50.

Figure 9:
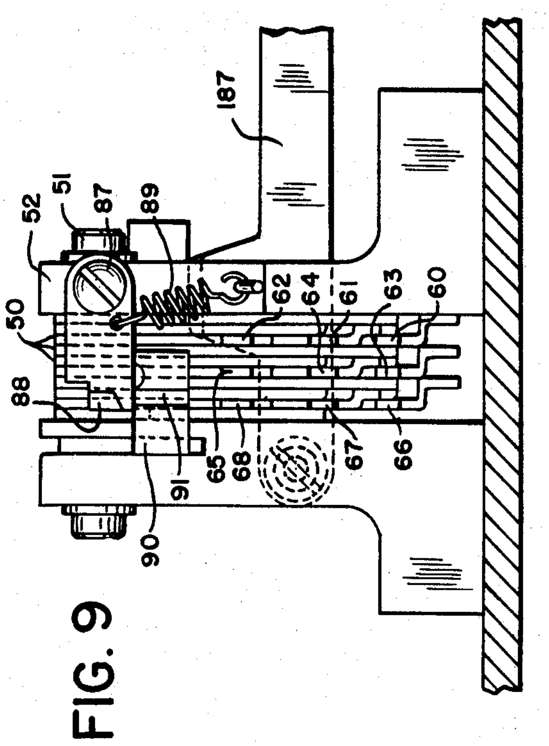
FIG. 9 is an elevational view showing the matrix pin actuating fingers and escapement pawls for controlling stepped shifting of the matrix.

In the particular arrangement as illustrated, the lever 50 for the digit 0 key has its curved arm extending furthest downwardly carrying upturned finger 60 at its lower end. The lever 50 for the digit 1 key has its curved arm extending a lesser distance beneath pintle 51 and carries upturned finger 61. The lever 50 for the digit 2 key has an even shorter curved arm beneath pintle 51 and carries upturned finger 62. The relationship of the three levers for the digit 0, 1, and 2 keys is best shown in FIG. 5. From this figure and as shown in FIG. 9, it will be seen that fingers 60 and 61 are offset laterally from the plane of the lever 50 with which each is associated such that fingers 60 and 61 are vertically aligned with finger 62.

The downwardly curved arms for the levers 50 operated by digit 3, 4, and 5 keys respectively, are correspondingly formed in length and offset to the heretofore described downwardly curved arms for the levers operated by the digit 0, 1 and 2 keys respectively. However, as best illustrated in FIG. 9, the upturned finger 63 on the curved arm of lever 50 for the digit 3 key as well as the upturned finger 64 on the curved arm of lever 50 for the digit 4 key and the upturned finger 65 on the curved arm of the lever 50 for the digit 5 key while vertically aligned are disposed in a plane laterally spaced from the plane common to the upturned fingers 60, 61 and 62.

The downwardly curved arms on the levers operated by the digit 6, 7, and 8 keys are also correspondingly formed to the arms and fingers 60, 61 and 62 but the upturned fingers 66, 67 and 68 on the arms of the levers 50 operated by the digit 6, 7 and 8 keys are disposed in a plane laterally spaced from the planes of the upturned fingers 60, 61 and 62, and 63, 64 and 65.

Two spaced guide rods 70 and 71 are mounted horizontally behind the bracket 52 which carries the group of levers 50 on pintle 51. These rods serve to slidably support an arcuate matrix 72. This mounting enables the matrix to slide laterally past the upturned fingers on the curved arms of the levers 50. To support the matrix 72 on rods 70 and 71 the lower end of the matrix is slotted at 73 to slideably engage over rod 71 while the upper end encircles rod 70 at 74 to slide along the rod.

The arcuate body of the matrix which may conveniently be formed of plastic, has three vertically spaced horizontal rows of openings formed therein. Each opening of the upper row slideably supports a pin 75 while the openings in the intermediate row each carry a pin 76, and the openings in the lower row carry pins 77. While the pins 75, 76 and 77 are slideable within the respective openings of the matrix 72, they are resistant to such sliding movement such that each pin will be retained in the position to which it is pressed until other external force is applied to shift the pin. This resistance to shifting is provided by plastic tubes 78 pressed into grooves passing along each row of openings. The plastic tube frictionally engages the surfaces of the pins in the row with which it is associated to hold the pins against free sliding movement in the matrix.

The relationship of the pins 75, 76 and 77 in the three horizontal rows may best be seen in FIG. 4. The matrix openings supporting pins have the axes thereof aligned with radii of the arc of curvature of the matrix 72. The three rows of pins also have a predetermined relation to the upturned fingers on the curved arms of levers 50. Thus the row of pins 75 on the matrix have the outer ends thereof at a level such that as the matrix slides on rods 70 and 71 pins 75 will pass the upturned fingers 62, 65 and 68 (FIG. 9). Likewise, the row of pins 76 will pass the upturned fingers 61, 64 and 67 as the matrix slides past the group of levers 50 and the row of pins 77 will move past upturned fingers 60, 63 and 66.

The input unit as illustrated is designed for use with multidigit numbers made up of nine digits. Of course, comparable units may be made within the teachings of this invention to accommodate numbers having more or less digits. Taking a unit designed to accommodate nine multi digit numbers, each of the three rows of pins on matrix 72 will contain 27 pins or three pins for each digit in the multi digit number to be accommodated.

The matrix will have nine discrete positions in the rear of the upturned fingers on the levers 50. At each position nine pins, three from each of the three rows, will be positioned to the rear of the nine upturned fingers, such fingers as previously described being arranged in three laterally spaced planes and three horizontal vertically spaced rows. Thus at each discrete position of the matrix behind the upturned fingers, the depression of a number key 15, except the digit 9 key, will move a finger toward one of the nine pins pressing the pin which it engages inwardly to project from the concave face of the arcuate matrix 72.

The matrix 72 is biased by spring 80 to move to the left from its stand-by position such as shown on FIG. 3. Spring 80 is connected to matrix 72 by link 81, passes around the pulley 82 mounted on the left side of the unit and is secured at its opposite end to the right side of the unit.

An escapement mechanism is provided to control sliding movement of matrix 72 such that the matrix will shift in succession through the nine discrete positions for actuation of the pins carried thereby by the upturned fingers of the levers operated by depression of the number keys. This escapement mechanism includes a member 85 on the matrix 72 provided with nine tapering abutments 86 at equally spaced positions along the length of member 85.

Figure 10:
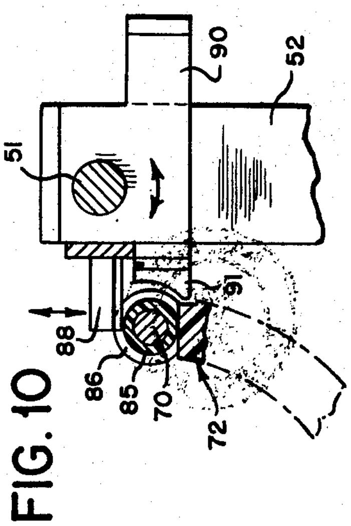
FIG. 10 is a detailed view with parts in section showing the functioning of the escapement pawls relative to the matrix.

Bracket 52 which, as described, supports the levers 50 also mounts on screw 87 a pivoted tongue carrying a primary pawl 88. This tongue is urged downwardly by spring 89. A second tongue 90 is pivotally mounted on pintle 51 and carries a secondary rearwardly extending pawl 91. A portion of tongue 90 extends beneath the horizontal portions of the levers 50 in front of bracket 52 such that the rocking movement of any lever caused by depression of a number key will in turn pivot tongue 90. The pivoted tongue carrying primary pawl 88 rests on the upper surface of the rearward portion of pivoted tongue 90, as shown in FIGS. 9 and 10.

Figure 11:
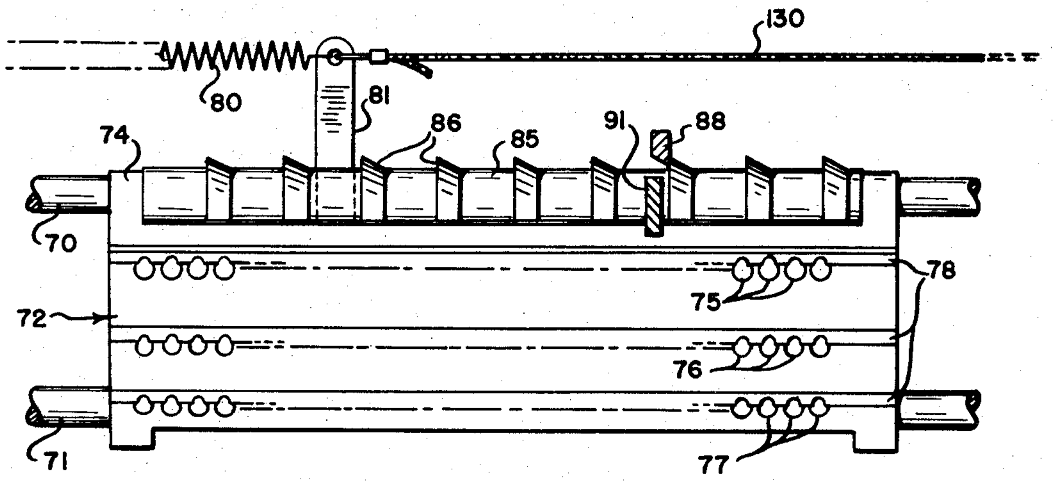
FIG. 11 is an elevational view of the arcuate matrix showing the relationship of the escapement dogs to the matrix.

For each discrete position of matrix 72 relative to the upturned fingers of levers 50, the primary pawl 88 will be engaged with one of the tapered abutments 86 on member 85 carried by the matrix such as shown in FIG. 11. In the initial standby position where the input unit is in readiness for insertion of a multidigit number, the primary pawl 88 will be engaged with the leftmost abutment 86 holding the matrix against the biasing action of spring 80 tending to move the matrix to the left. As each number key to comprise the multi digit number to be inserted is depressed, the lever 50 rocked by such key will in turn pivot tongue 90 initially moving secondary pawl 91 in behind the nearest abutment 86 from its position as shown in FIG. 10. This movement of tongue 90 will also raise the pivoted tongue carrying primary pawl 88 thereby disengaging this pawl from the abutment 86. Spring 80 will then slide matrix 72 toward the left until the secondary pawl 91 stops movement by engagement with the abutment 86 just released by pawl 88.

As the number key which has been depressed is released, the spring 43 for such key will raise the key and in turn return the associated lever 50 to its at rest position. Pivoted tongue 90, no longer being held down by a lever 50, withdraws its lower secondary pawl 91 from engagement with the abutment 86, thus releasing the matrix 72 to be moved leftward under the influence of spring 80. Simultaneously, the spring 89 drawing down the pivoted tongue carrying primary pawl 88 moves this pawl to a position where the next following abutment 86 will be engaged. Thereby the succeeding discrete position for the matrix will have been reached with a new set of nine matrix pins disposed opposite the nine upturned fingers of levers 50.

A shaft 95 is mounted horizontally behind the rod 70 which slidably supports the matrix 72. Shaft 95 rotatably supports a series of digit display wheels 96. Although each wheel is rotatable relative to shaft 95, the wheels are constrained to rotate with the shaft by a plug 97 of Teflon or other friction material disposed in a radial bore of the wheel, the plug being pressed in against shaft 95 by screw 98. Thus when shaft 95 is rotated, the wheels 96 tend to rotate therewith but may be held against rotation when the frictional drag between plug 97 and shaft 95 is overcome. A spacing washer 99 may be disposed between adjacent digit display wheels to minimize frictional drag between adjacent wheels when one wheel is stopped, shaft 95 is still rotating and a wheel adjacent thereto is to continue rotating to the digit that it is to display.

Each wheel displays on the circumference thereof the digits 0 through 9 individually spaced around a portion of such circumference. On FIG. 3 the wheels 96 are shown at their normal stand-by position whereat, were the cover 12 for the housing 11 to be in place, no digits would be displayed through window 20 of the cover. By rotating the wheels and selectively stopping them at the digit positions to make up a multidigit number the wheels collectively will display through window 20.

Each wheel 96 also carries three circumferentially spaced studs 100, 101 and 102. These studs are disposed on the wheel periphery, as shown most clearly on FIG. 13, in laterally spaced planes, stud 100 being disposed adjacent one side of the wheel, stud 101 being centered along the length of the wheel and stud 102 being adjacent the opposite side of the wheel. The studs 100, 101 and 102 protrude from the wheel periphery such that when the matrix 72 is disposed in front of the series of digit display wheels and thereupon shaft 95 rotated in a counterclockwise direction such as viewed in FIGS. 4 and 12, one or another of the studs will engage with a pin 75, 76 or 77 pressed inwardly of the concave face of the matrix by one of the fingers on the key actuated levers 50.

Engagement of a wheel carried stud with a matrix pin will stop rotation of the wheel from which the stud projects with the friction plug 97 sliding over shaft 95 while the shaft continues to rotate. By this arrangement it is possible to stop each wheel at a position which will display any one of the digits 0 through 8 on the wheel through display window 20 as desired.

A stop rod 105 extends across the wheels 96 in a position to be engaged by any one of the wheel studs 100 thereby acting as a maximum limit for wheel rotation when no matrix pin has been pressed in. When any wheel's stud 100 engages stop rod 105 the digit 9 on such wheel will be displayed through window 20.

The functioning of the parts heretofore described in inserting a multi digit number into the input unit may now be exemplified. Initially the digit display wheels will all be at their normal stand-by position whereat no digits are displayed on the wheels through window 20 of the unit. The matrix 72 will be disposed at the first of its nine discrete positions, the unit being in readiness for insertion of a nine digit number.

In this first position of matrix 72 the first nine matrix pins, namely, the first three pins 75 in the upper row, the first three pins 76 in the middle row, and the first three pins 77 in the lower row, are disposed opposite the upturned fingers on the downwardly curved arms of the key actuated levers 50. All of these pins on the matrix will be disposed in their retracted position whereat they extend from the convex surface of curved matrix 72. In their projected position they extend inwardly of the concave matrix surface.

In this first position for the matrix it will be understood that any one of these nine pins may be pressed inwardly of the matrix by one of the upturned fingers and as previously described, each finger is operable by one of the number keys 15 for the digits 0 through 8. Specifically, the finger 60 on the lever 50 operated by the digit 0 number key will press in the first pin 77, in the lower row, the finger 61 on the lever 50 operated by the digit 1 number key will press in the first pin 76 in the middle matrix row and the finger 62 on the lever 50 operated by the digit 2 number key will press in the first pin 75 in the upper row. Similarly, the fingers 63, 64, 65, 66, 67 and 68 will, if operated by their associated number keys, press in one of the other pins of the nine pins opposite the fingers for this first position of the matrix. The digit 9 number key associated with a lever 50 having no upturned finger will, when depressed, not press in any matrix pin. It will thus be appreciated that for each discrete position of the matrix relative to the upturned fingers on the key actuated levers 30, there are 10 distinct conditions for the nine pins at each matrix position, namely, any one of the nine pins pressed inwardly plus a condition where all of the pins remain retracted.

As each digit to make up a multi digit number is inserted into the input unit 10, the escapement mechanism will be operated moving the pawls 88 and 91 as heretofore described. This will release the matrix which under the action of spring 80 will move to the next discrete matrix position. A new set of nine matrix pins will then be disposed opposite the fingers on levers 50 and the next digit inserted by pressing the appropriate number key 15 for the multidigit number. Thereupon one of the new set of matrix pins will be pressed inwardly or no one of such pins pressed inwardly if the digit 9 is being inserted.

Once all of the nine digits for the multi digit number have been inserted, the matrix 72 under the controlled release of the escapement mechanism, will have successively shifted through nine positions to be then located directly in front of the series of number display wheels 96. Incident the insertion of the last digit of the number and the escapement mechanism releasing the matrix to move into alignment in front of the digit display wheels 96 each set of nine matrix pins for each of the previously mentioned discrete matrix positions will be disposed opposite one of the nine wheels 96.

The shaft 95 is then driven in a counterclockwise direction collectively rotating all of the digit display wheels 96 under the frictional driving force of the Teflon plug 97 in each wheel being pressed against the shaft. The particular one of the set of nine matrix pins which has been pressed inwardly determines the point at which each wheel 96 is stopped and correspondingly determines the digit on the wheel that will be displayed through window 20 of the unit.

For example, if the first matrix pin 77 of the set of nine pins opposite a wheel 96 has previously been depressed by finger 60 on the lever actuated by the digit 0 number key, this matrix pin will engage the closest stud, namely stud 100 on wheel 96, as the wheel rotates. Thus a minimum amount of rotative movement of the wheel will take place and correspondingly the first digit on the wheel, namely 0, will be displayed through window 20. A matrix pin 76 pressed inwardly by upturned finger 61 will also engage stud 100 but will permit a greater angle of rotation of the wheel since such pin is in the middle row on the matrix. This greater rotation will result in display of digit 1 through window 20. In turn, a pin 75 previously pressed inwardly on the matrix by finger 62 will also engage stud 100 permitting a greater rotation of the wheel since this finger will press a pin in the upper row on the matrix.

Matrix pins pressed by any one of the fingers 63, 64, or 65 will engage the middle stud 101 stopping the wheel 96 at different degrees of angular rotation such that one of the digits 3, 4, or 5, respectively will be displayed. Likewise, a matrix pin pressed inwardly by one of the fingers 66, 67, or 68 will engage the stud 102 stopping the digit display wheel 96 where the individually differing degrees of angular rotation will display the digit 6, 7 or 8, respectively. Where no pin of the set of nine pins opposite a display wheel 96 is pressed inwardly, that wheel will continue rotation with shaft 95 until the first stud 100 engages stop rod 105. This will stop the wheel with the digit 9 on such wheel display through window 20.

With the multidigit number inserted in the unit, a visual check of the number displayed in window 20 of the unit may conveniently be made to confirm that the desired digits and their proper order to make up the multi digit number were inserted by successive depression of the number keys 15. The unit is now in readiness to transmit coded digital signals representing the multidigit number.

In the embodiment illustrated, the coded digital signals for each digit of the number are transmitted over a separate wire to the digital equipment where the unit 10 is functioning as an input unit or memory unit A where the input unit is functioning in an information checking system. Thus nine wires in cable 30 simultaneously transmit the digital signals for the nine digits of the number. These signals for each digit of the number are generated by rotative movement of the digit display wheels 96.

Each wheel 96 has embedded in the perimeter thereof four peripherally spaced conductive segments 110, 111, 112 and 113. The wheels are preferably constructed of non-conductive plastic material whereby these four segments can be of conductive metal and employed as portions of a switch unit. A pair of switch wipers 115 for each digit display wheel 96 are mounted on a bar 116 of insulating material, the bar being mounted along the rear of the series of wheels 96. The two wipers 115 of each pair are insulated from each other and each has the end portion resting as a contact against the periphery of the digit display wheel with which it is associated. One wiper contact of each pair engages adjacent one side of the wheel and the other wiper contact engages adjacent the opposite side of the wheel. It will be appreciated that with the wipers 115 resting against the non-conductive surface of a wheel 96 the electrical path between the pair of wiper contacts will be open. Likewise, when the wheel is rotated, successively bringing the conductive segments 110, 111, 112 or 113 beneath the contact ends of the pair of wipers 115, the electrical path between this pair of wipers will be successively closed.

Figure 14:
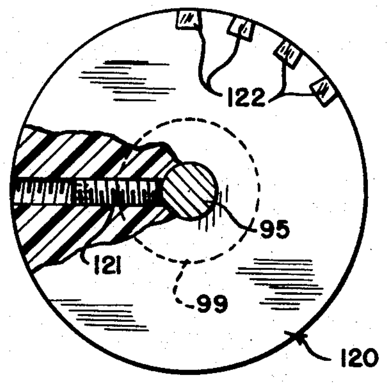
FIG. 14 is an end elevation of the timing wheel mounted on the common shaft with the digit display wheels, the shaft and a portion of the timing wheel being shown in section.

At one end of the series of digit display wheels there is mounted a timing disc 120. This timing disc preferably is made up of insulating plastic material and is secured to rotate at all times with shaft 95 by means of set screw 121. The periphery of timing disc 120 has embedded therein four timing contacts 112, these contacts being circumferentially spaced as shown in FIG. 14. A pair of brushes 123 (see FIG. 3) are mounted on insulating bar 116 such brushes being similar to the wipers 115 and being insulated from each other. These two brushes have the ends thereof resting as contacts against the periphery of timing disc 120, one engaging adjacent each side of the timing disc.

As the timing disc rotates with the shaft, the four contacts 112 successively pass beneath brushes 123 closing the circuit between these brushes each time one timing contact passes therebeneath. The four pulses resulting from closing the circuit between brushes 123 as the four contacts 112 pass therebeneath are transmitted by a separate wire in cable 30 to the digital equipment or memory unit A to be usable therein as indicative of the end of each code period in which a coded bit for the four bits making up a digit is to be detected.

It will be understood that one of each pair of switch wipers 115 as well as one of the pair of brushes 123 will, during transmission of the coded digital signals be connected to an appropriate power supply such that pulses will be created through the wipers and brushes as the conductive segments and contacts 122 pass. A 24-volt direct current power supply is well suited for this duty in the operation of input unit 10.

Referring to the coding for the respective digits as tabulated on page 17 and taking the transmission of digital signals for digit 1 as an example, it will be understood that in transmitting digital signals for digit 1, immediately before the first timing pulse is sent by the closing of brushes 123 by the first contact 122 on disc 120, a positive pulse will be sent over the wire. In sequence the second, third and fourth timing pulses will be transmitted over the timing wire but preceding each of these pulses no pulse will be sent over the wire for the digital signals since the digit 1 has as each of the last three bits for its code the absence of a pulse.

The coding created by each digit display wheel 96 by reason of the conductive segments closing the brushes 115 as they pass thereunder may best be described by reference to FIG. 12. On the wheel 96 shown in this figure, numeral designators 0 or 1 have been added to characterize the manner in which the code for each digit is generated. As the coding is tabulated on page 17, the 0 designator refers to the absence of a pulse and 1 the presence of a pulse.

Figure 12:
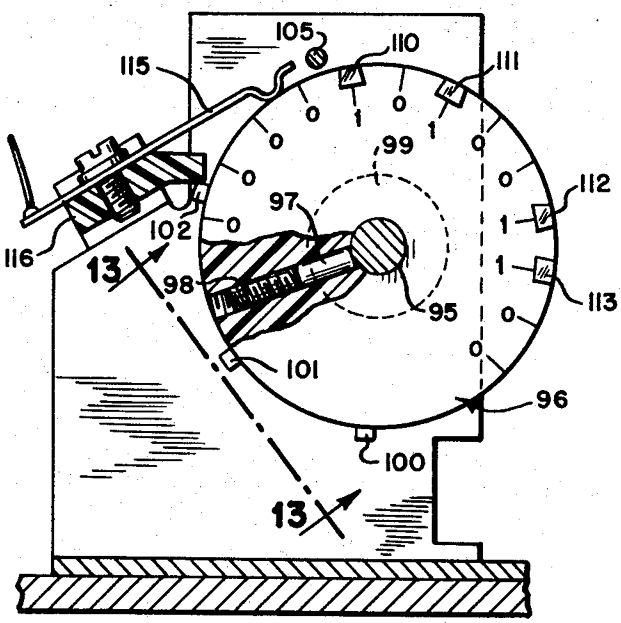
FIG. 12 is vertical sectional view through the series of digit display wheels with a portion of one display wheel shown in section.
Figure 13:
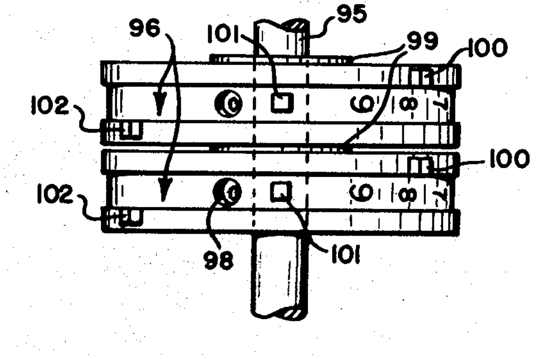
FIG. 13 is an elevational view of two of the series of digit display wheels taken on line 13—13 of FIG. 12.
Figure 18:
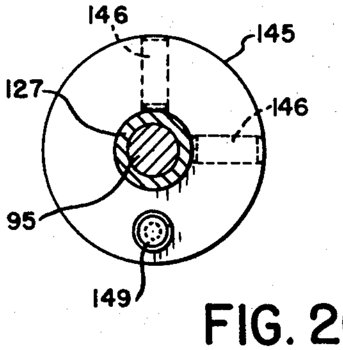
FIG. 18 is a view taken on line 18—18 of FIG. 15.
Figure 19:
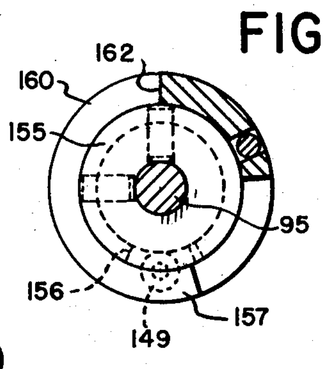
FIG. 19 is a view taken on line 19—19 of FIG. 15.
Figure 20:
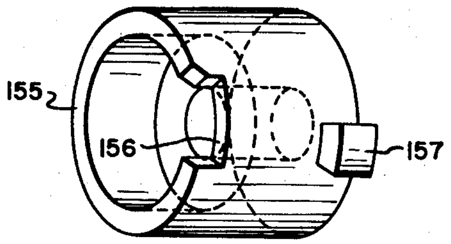
FIG. 20 is a perspective view of the driving ring for the shaft carrying the digit display wheels.
Figure 21:
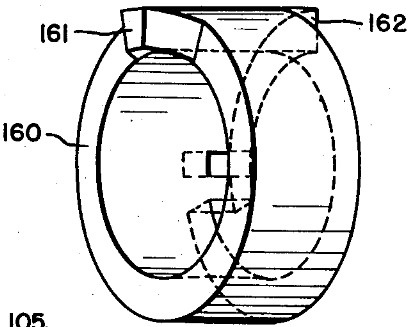
FIG. 21 is a perspective view of the cylindrical throw-out cam forming a part of the reversible drive for the digit display wheel carrying shaft.
Figure 22:
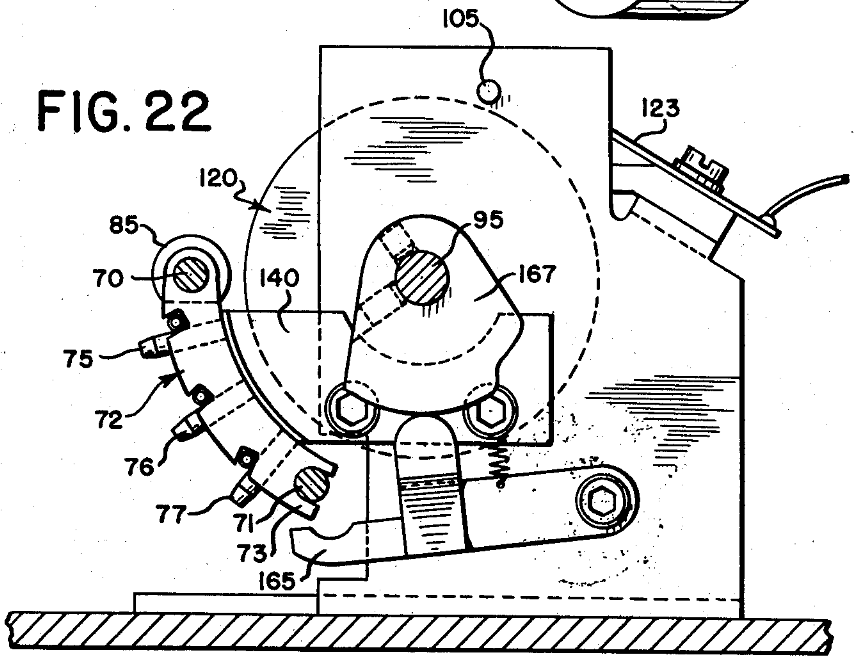
FIG. 22 is a vertical sectional view showing the relationship of the latch and release cam to the slidable matrix.

The digit display wheel 96 as shown on FIG. 12 is in its normal stand-by position where the blank upper surface portion of the wheel between segments 110 and 111 will be visible through window 20 of the unit. In other words, no digit on the wheel will be displayed on the window 20. This stand-by position for all of the series of wheels is established by the trailing wheel studs 102 engaging the end of bar 116 when shaft 95 is driven clockwise or what may be termed in "reverse" to return the wheels to the stand-by position. It is during this clockwise movement of the shaft 95 and wheels 96 carried thereby that the digital signals for each of the nine digits of the number are transmitted.

When a display wheel 96 has been rotated counterclockwise or what may be termed "forwardly" in the manner heretofore described to display digit 0 in window 20, the segment 110 on the wheel will lie just in front of but not beneath the contacts of the pair of wipers 115 associated with the wheel. To send the four bit binary code for the digit 0, shaft 95 is rotated in a clockwise or "reverse" direction carrying the display wheel clockwise until its stud 102 engages bar 116. This degree of movement will not result in any conductive segment on the wheel closing a circuit across the brushes 115. Thus as shaft 95 continues to rotate carrying with it the timing disc 120, the four timing pulses created by contacts 122 successively closing through brushes 123 will be sent with no digital signal pulse being sent preceding each timing pulse. This transmission will designate the 0 digit in accordance with the code on page 17, namely, four 0 or no pulse bits.

Following this example, where a display wheel 96 has been rotated counterclockwise or "forwardly" to show the digit 1 in window 20, the segment 110 will have passed beneath the contacts of the wipers 115 associated with the wheel to lie just rearwardly of the wiper contacts. As already explained, the wheel to display and thereafter send digit 1 will be stopped in its forward rotation by a matrix pin 76 previously actuated by lever finger 61 engaging the stud 100 on the wheel. When the digital signals for digit 1 are to be transmitted, shaft 95 is rotated in the reverse direction whereupon segment 110 initially passes beneath and closes the circuit between the contacts of wipers 115 sending a pulse before the first timing pulse is transmitted. The wheel will reach and stop at its normal stand-by position by its stud 102 engaging bar 116 without any further pulses being sent other than the remaining three timing pulses. Thus the digital signals in accordance with the binary code for digit 1 on page 17 of one pulse bit followed by three bits absent pulse will be transmitted.

Sending the code for the digit 9 may be described as a further example. To display this digit in window 20, display wheel 96 will have rotated forwardly until stud 100 engages stop rod 105. In this action all of the conductive segments will have passed beneath the contacts of wipers 115 as will have the last two 0 designators shown on the wheel on FIG. 12. As shaft 95 thereafter is rotated in a reverse direction carrying wheel 96 along with it to send the digital signals for the digit 0, the first two code bits preceding each of the first and second timing pulses will be absent pulses as the portion of the wheel carrying the two 0 designators pass beneath wipers 115. Then before the third timing pulse is generated segment 113 will pass beneath the wipers 115 sending a pulse and thereafter before the fourth timing pulse is sent the segment 112 will pass beneath wipers 115 sending a second pulse. This completes transmission of the digital signals for digit 9, namely, 0011 designators. The transmission of the fourth timing pulse after segment 112 has closed a circuit through the wipers 115 terminates the transmission of digital signals for one digit, the digital equipment or memory unit being set up to not react to any subsequent pulses after the fourth timing pulse has been received pending resetting, insertion and transmission of the next multi digit number. Thus the pulses generated as wheel 96 continues to rotate when segments 111 and 110 pass beneath wipers 115 are not accepted at the digital equipment or memory unit as denoting signals for a digit.

The manner of generation of the four bit binary code for each digit should be clear from the above-described examples for the digits 0, 1 and 9. Considering the 0 and 1 designators shown on FIG. 12 the coded signals for the digits are made up of groups of four of such designators. Thus the rearmost designators 0000 denote the code for the digit 0 and the forwardmost four designators 0011 denote the code for the digit 9.

The reversible drive for shaft 95 will now be described. For purposes of description, counterclockwise rotation of shaft 95 as viewed on FIG. 12 to insert the multi digit number and display it by the display wheels 96 will be referred to as "forward" while clockwise rotation as viewed on FIG. 12 to reset the digit display wheels and send the digital signals for the number will be identified as "reverse."

The shaft of motor 34 carries a worm 125 drivingly engaged with a worm wheel 126. Worm wheel 126 is journalled on shaft 95 to be rotatable relative to such shaft and has an extended hub sleeve 127 which rotatably mounts a matrix return reel 128. Cord 130 has one end fastened to the periphery of reel 128 with the remainder of the cord wrapped in the V groove of such reel and extending therefrom around pulley 131. The opposite end of such cord is secured to link 81 mounted on matrix 72.

To keep cord 130 in the V groove of reel 128 in certain instances where slack in the cord may exist, there is provided a retaining coil spring 132 fixed at its ends to suitable stationary portions of the unit such that the spring rests in the V groove of the reel 128 and encircles approximately half of the circumference of such reel. This retaining coil spring also acts as a frictional brake resisting free rotation of reel 128 on the hub sleeve 127 of worm wheel 126.

One end of reel 128 carries a switch actuating dog 135. This dog is positioned to engage the operator 136 of a double throw switch 137, such switch being stationarily mounted on the unit such that the switch operator 136 is moved to one position when the reel carried dog 135 engages it while the reel is rotating in one direction and the operator is shifted to its other position when the reel carried dog is moving with the reel in the opposite direction.

With the unit in its condition as shown on FIG. 3, matrix 72 being at its first discrete position in readiness to insert the first digit of a multidigit number, the cord 130 connected to the matrix by link 81 is wound on reel 128. As each digit of the multi digit number is inserted and the matrix, under the controlled release of the escapement mechanism, permitted to move through the nine discrete positions in inserting nine digits, the spring 80 draws the matrix to the left and at the same time draws cord 130 off of reel 128 thereby rotating this reel and moving switch operating dog 135 around with the reel. When the last digit has been inserted and the matrix moved to be aligned in front of the series of display wheels 96, the dog 135 on reel 128 will engage and press down on switch operator 136 shifting the switch 137 to its lower position. In this position of switch 137, the circuit to drive motor 34 is completed for the motor to run in its forward direction, rotating shaft 95 forwardly, and driving the digit display wheels 96 to display the multi digit number.

When the multi digit number is displayed in its entirety through window 20 the reel 128 is driven by means described hereinafter in the reverse direction to rewind cord 130 on reel 128 drawing matrix 72 back against the force of spring 80 to cock the matrix in readiness for the next operation of the unit. Matrix return reel 128 also carries adjacent its hub an abutment 138. This abutment is engaged as will be described, to drive the reel in returning and cocking the matrix. In this cocking action the reel 128 rotates through a sufficient angular extent to carry switch operating dog 135 around and engage beneath the switch operator 136. As the dog rises in the final rotation of reel 128 its shifts operator 136 to the upper position of switch 137 thereby interrupting the forward drive circuit for motor 34 and at the same time conditioning the motor to be driven in the reverse direction for rotating shaft 95 in reverse to reset the display wheels and send the digital signal for the multidigit number.

A cam 140 which has a segment of a cone surface is stationarily mounted to the right end of the display wheels 96 and timing disc 120. This cam is disposed to the right as shown on FIG. 3 of the position whereat the matrix pins are pressed inwardly by the upturned fingers on levers 50. After the digits for a number have been inserted by appropriate rotation and stopping of the digit display wheels under the control of the matrix pins as described hereinabove, the matrix is drawn back or returned to its starting position by winding word 130 on reel 128. As this latter action takes place the concave matrix surface sweeps past the conical segment surface of cam 140. In doing this, any of the pins extending inwardly of the matrix are cammed outwardly so that in the cocked or returned position of the matrix all pins extend outwardly from the convex surface of the matrix in readiness for the next number to be inserted.

The drive for the matrix return reel 128 is provided by a collar 145 fixedly secured to the hub sleeve 127 of worm wheel 126 by a set screw 146. This collar carries a shift rod 147 biased toward one end of collar 145 by spring 148. The shift rod 147 has an enlarged head 149 at one end and a pin end 150 at the opposite end. This pin end 150 is shifted to engage with the abutment 138 on reel 128 when the reel is to be driven in reverse to return the matrix.

The shaft 95 carrying wheels 96 and timing disc 120 has a ring 155 drivingly secured thereto. This ring has a cut out section 156 at one end thereof to drivingly receive the enlarged head 149 of shift rod 147. When shaft 95 is to be driven forwardly incident positioning the display wheels for the multi digit number being inserted, the enlarged head 149 of shift rod 147 is engaged in the cut out section 156 of ring 155. As worm 125 drives worm wheel 126, collar 145 on the worm wheel hub sleeve 127 also rotates transmitting through shift rod 147 driving power to ring 155.

A cylindrical thow out cam 160 having a single cam hump 161 is fixedly secured to the frame of the unit with such cam encircling the ring 155 secured to shaft 95. This cam also has a cut out ending in a stop wall 162 engageable with a stop pin 157 carried by shaft ring 155. This pin 157 is disposed axially in line with the mid point of cut out section 156 in ring 155.

From the stand-by position of the unit 10 as shown in FIG. 3, the matrix is successively shifted to the left incident insertion of a multi digit number and after the last digit has been inserted, reel 128 will have been drawn around by cord 130 until operating dog 135 throws switch 137 to its lower position completing the circuit to drive motor 34 in a forward direction. Shift rod 147 will be engaged in the cut out section of ring 155 on shaft 95 and thereby rotate the shaft forwardly.

A rotational arc of around 180° for shaft 95 is adequate to rotate the digit display wheels 96 sufficiently for even the highest digit which can be displayed, i.e., 9. The shift rod and cut out section 156 are so related to the hump 161 on throw out cam 160 that slightly over 180° of rotation of shaft 95 will have occurred before the enlarged head 149 of the shift rod engages the cam surface of hump 161 on the stationary throw out cam 160. At this time the stop pin 157 on ring 155 will engage the stop wall 162 of the throw out cam. The hump 161 will disengage shift rod 147 from cut out section 156 against the force of spring 148 while stop pin 157 on ring 155 will terminate further forward rotation of shaft 95.

Once enlarged head 149 is cammed out of the cut out section 156 by hump 161, this head of the rod will ride on the remaining annular end surface of ring 155 while the ring stops and the cut out section 156 awaits re-entry of the enlarged head 149 after collar 145 has completed revolution in the forward direction. This holds shift rod 147 against the biasing action of spring 148 with the pin end 150 of such rod projecting into the path of the abutment 138 carried on matrix return reel 128. Thus as forward rotation of the worm wheel and collar 145 continues, the pin end 150 of the shift rod engages abutment 138 carrying it along with the worm wheel and simultaneously winding cord 130 onto the reel to return matrix 72. Incident matrix return any matrix pins will be cleared from their inward projection relative to the matrix as the matrix passes cam 140.

When the shift rod 147 has moved around with collar 145 to the point where enlarged head 149 again overlies the cut out section 156 of ring 155, spring 148 shifts the rod reintroducing enlarged head 149 into the cut out section 156 and withdrawing the pin end 150 from driving abutment 138 on the matrix return reel 128. At this point the matrix will have been fully returned to be in cocked position for the next utilization of the unit and likewise the switch actuating dog 135 will have engaged the underside of operator 136 of switch 137 shifting the switch to its upper position and consequently de-energizing the motor 34 whereupon the unit comes to an at rest position. It will be noted that with the shift rod 147 re-engaged with the cut out section 156 in ring 155 the unit is in condition for the motor to drive shaft 95 in reverse direction incident resetting the digit display wheels and sending the digital signals representative of the multi digit number.

Once the multi digit number has been inserted in the unit, displayed in window 20 and the matrix returned to a cocked position, all as described hereinabove, it is desirable that the matrix be held completely inactive so that accidental depression of any of the number keys 15 will not cause any operation of the parts which would alter the number inserted until the digital signals for the number have been transmitted and the display wheels reset to their normal stand-by position. To achieve this a latch 165 is pivotally mounted beneath shaft 95 having a forwardly extending end biased upwardly toward the slotted lower end 73 of the matrix 72 where the matrix engages over rod 71 (see FIG. 4). This latch 165 is operated by a cam 167 secured by set screw to shaft 95.

When the unit is in normal stand-by condition with no digit displayed in window 20, cam 167 holds the latch 165 down out of the sliding path of the matrix 72. When the last digit of a number is inserted and switch 137 operated to start motor 34 in the forward direction, cam 167 rotates out of engagement with latch 165 and the latch rises. Then as the matrix is returned by wind up of cord 130, latch 165 is cammed downwardly by the bottom of the matrix until the matrix has passed the latch whereupon the latch rises in front of the end of the matrix to hold it back, free from control by the escapement mechanism, and thus out of position to have any matrix pin pressed inwardly by one of the number keys 15.

This latched condition of the matrix continues while the shaft 95 is driven in reverse direction to reset the display wheels 96 and send the digital signals. When the shaft 95 has been driven in reverse direction for approximately 180° the cam 167 will have returned to engagement with latch 165 pressing the latch downwardly to disengage it from the leading end of matrix 72. Under the biasing action of spring 80 the matrix will then shift to the left with the first tapered abutment 86 of the escapement mechanism engaged with primary pawl 88. The unit is then again ready for insertion of the next multi digit number.

The reverse driving of shaft 95 through the requisite 180° arc is effected by reversing the direction of drive of motor 34 with consequent rotation of worm wheel 126, ring 155 and transmission of driving force through the enlarged head 149 of shift rod 147 to the cut out section 156 of ring 155.

The shaft 95 also carries at its outer end a switch shifting cam 170. This cam engages a rocker 171 pivotally mounted on screw 172. A spring 173 biases the rocker 171 into continuous engagement with cam 170. Rocker 171 carries a switch 175 including an upper contact 176 and a lower contact 177 with a switch operator 178 having a bowed spring 179 pressing against the lower contact 177. The operator 178 is apertured intermediate its length such that the lower contact 177 may be bent upwardly from the position shown on FIG. 7 to close the switch by engaging upper contact 176. In the position shown, the spring 179 biases contact 177 downwardly but when the operator 178 shifts to extend downwardly the spring 179 passes over center and snaps the lower contact 177 into engagement with contact 176.

The switch 175 is intended to be operated by the sending key 22 when it is desired to send the digital signals representative of a multi digit number and simultaneously reset the display wheels. Sending key 22 is mounted on an arm 180 pivotally connected at its forward end on stud 181. A spring 182 biases arm 180 to a normal upper position. The rear end of arm 180 has a lateral projection 183 which when the sending key is depressed moves downwardly against operator 178 of switch 175. A stationary ledge 185 is disposed beneath operator 178 such that under certain conditions the switch 175 will be operated to its open condition after once being closed by depression of the sending key 22.

Figures 7, 15, 16:
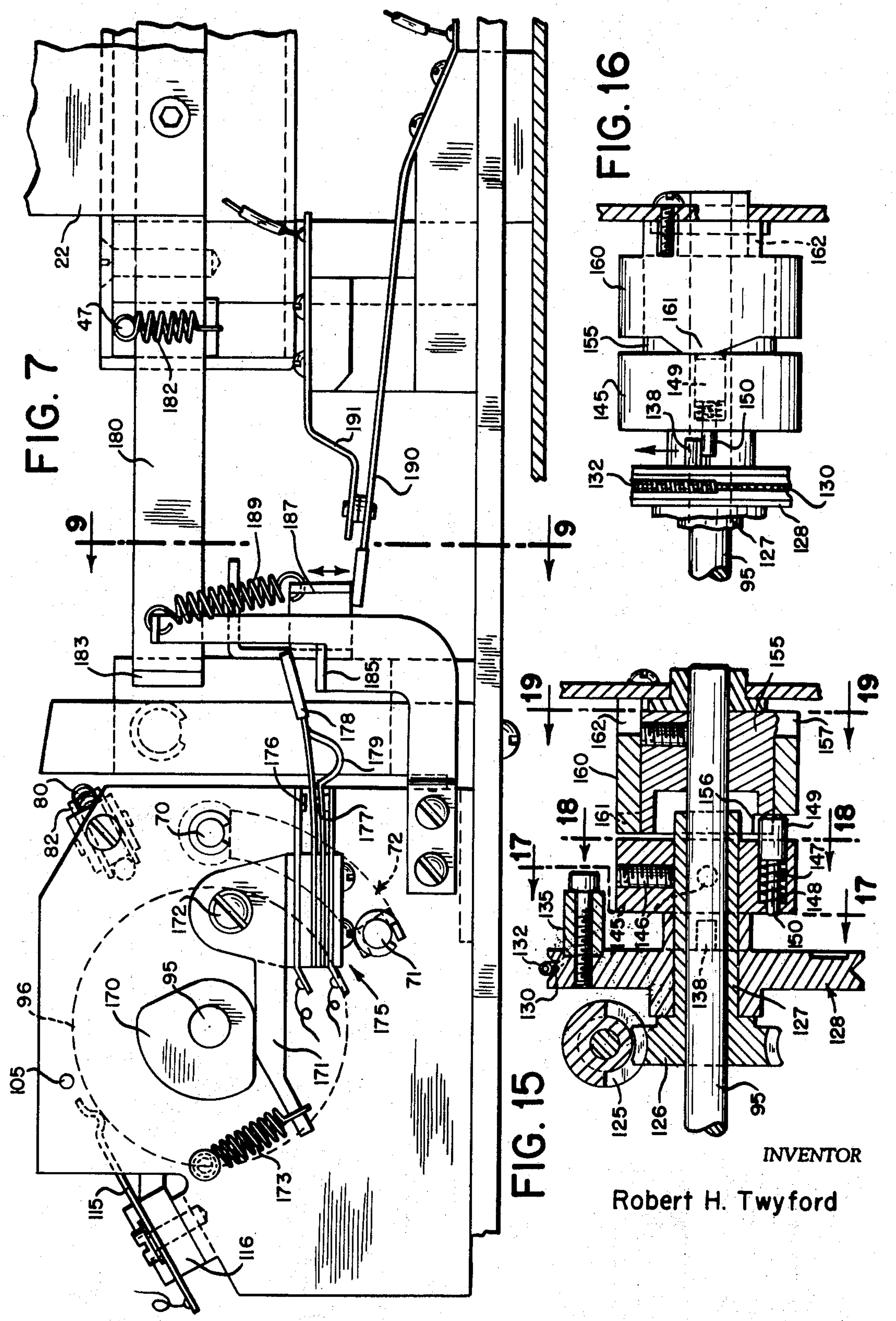
FIG. 7 is a side elevational view of the input unit of FIG. 1 with the cover thereof removed and a portion of the housing shown in section.
FIG. 15 is a vertical sectional view showing the relationship of the parts of the reversible drive for the shaft carrying the digit display wheels.
FIG. 16 is an elevational view showing the reversible drive parts for the digit display wheel carrying shaft with the parts engaged for driving the matrix return wheel.
Figure 8:
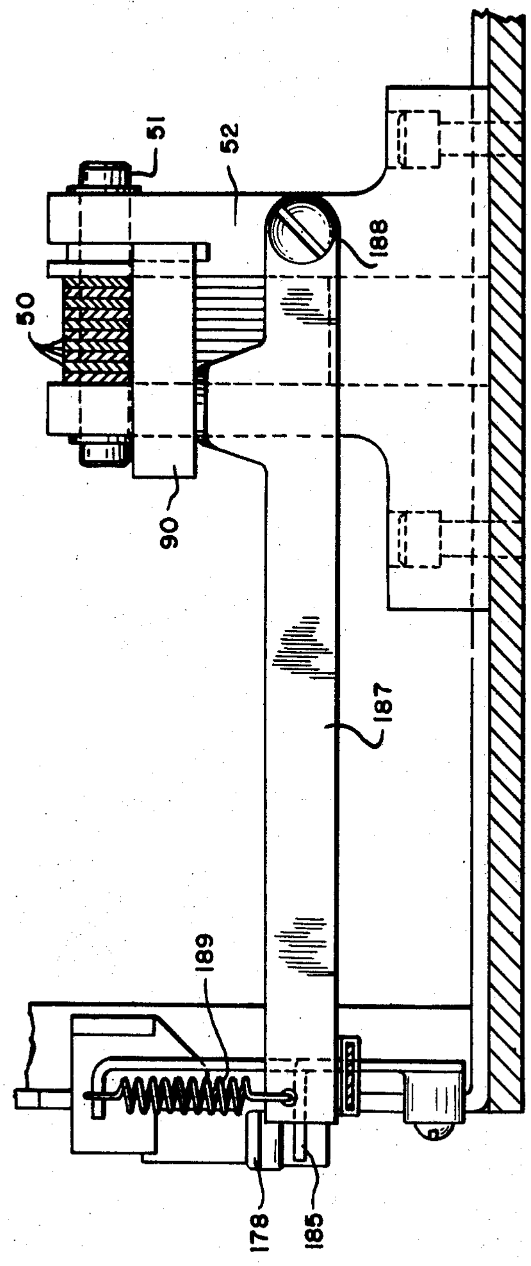
FIG. 8 is a view taken on line 9—9 of FIG. 7.

The cam 170 on shaft 95 by swinging rocker 171 and switch 175 carried thereon, functions to change the switch from its closed to open state, thereby conditioning it in readiness for the next depression of the sending key 22. In the state of the parts as shown in FIG. 7, the cam 170 is disposed at the position where the digit display wheels are in their normal stand-by position and the matrix is held by the escapement mechanism ready for the digits of the number to be inserted. The axial compression of spring 179 holds operator 178 up with lower contact 177 of switch 175 held down out of contact with contact 176.

In this state, depression of sending key 22 will not close switch 175. This is due to the fact that even if the key be depressed whereupon the projection 183 presses down against operator 178, the operator will engage against ledge 185 before it passes dead center. The relation of rocker 171 and cam 170 holds the switch 175 so that ledge 185 keeps the operator from being pressed past dead center, such as is necessary to snap lower switch contact 177 up against upper contact 176. With the number inserted into unit 10 and switch 137 closed to energize motor 34 and rotate shaft 95 in the forward direction, cam 170 swings rocker 171 until the disposition of switch 175 is such that the operator 178 thereof may be pressed by projection 183 on arm 180 far enough downwardly before engaging shelf 185 to shift the operator past dead center and thereupon snap the lower contact 177 into engagement with the upper contact 176.

Thereafter when the sending key is depressed it will swing arm 180 downwardly against operator 178 resulting in closing switch 175. This closing action in the preferred hook-up for the unit in a credit verification system connects the unit to await receipt of the enabling signal unique to such unit from the memory unit. When the enabling signal is received as detected by the circuitry in the unit, a relay (not shown) is energized which upon closing energizes motor 34 to rotate it and shaft 95 in the reverse direction.

This reverse rotation not only completes sending of the digital signals for the number, resets the digit display wheels to their normal stand-by position and through cam 167 releases latch 165 for the matrix to return to shifting control by the escapement mechanism, but also rotates cam 170 which swings rocker 171 such that switch 175 moves its operator 178 down against ledge 185. This movement continues until the operator passes dead center whereupon the lower switch contact 177 snaps out of engagement with contact 176 and the switch is opened, the parts returning to the condition shown in FIG. 7. When switch 175 snaps open under the action of cam 170 and rocker 171, the reverse drive energization of motor 34 and rotation of shaft 95 is terminated leaving the unit fully conditioned for the next multi digit number to be inserted.

As a safety feature in avoiding the possibility of any energization of motor 34 in a forward direction to return the matrix when a key is pressed, a lever 187 is pivotally secured at 188 to bracket 52. A spring 189 biases this lever upwardly so that a lateral extension thereof engages the underside of pivoted tongue 90. A free end of lever 187 engages the lower spring contact 190 forming half of a switch having an upper spring contact 191. This switch as made up of contacts 190 and 191 is connected in the energization circuit for forward driving of motor 34. Each depression of a number key 15 acts through a lever 50 to depress tongue 90, this tongue in turn depressing lever 187 which opens the circuit through the switch formed by spring contacts 190 and 191. Accordingly, as long as any number key is held down the motor 34 will not be energized to drive in a forward direction the shaft 95 or return the matrix 72.

It is to be understood that the form of the invention herein shown and described is to be taken only as a preferred example of the same and that various changes in size, shape and arrangement of parts may be resorted to without departing from the spirit of the invention or the scope of the appended claims.

I claim:

1. A system for selectively checking from a plurality of remote locations information accumulated at a central location comprising a plurality of remote inquiry units disposed at spaced locations to be accessible to persons requiring periodic access to information accumulated at a central location, each said unit having a keyboard of 10 number keys individually representing the digits 0 through 9 respectively, a series of digit display wheels rotatable about a common axis with each wheel bearing the digits 0 through 9 individually spaced on the circumference of the wheel and each wheel having a normal standby position common to all of said wheels, means in each unit for rotating and stopping said wheels in representing a multidigit number inserted into the unit by successively depressing the appropriate number keys making up said number whereby collectively said wheels display said multidigit number, and a sending key for operating the unit to transmit digital signals representing said multidigit number, operation of the unit in response to said sending key also acting to reset said wheels to said normal standby position, and a central information storing unit connected to each of said inquiry units to receive said digital signals representing multidigit numbers, said storing unit having means therein for comparing said digital signals as received from said inquiry units with stored information and for returning a reporting signal to the respective inquiry units indicative of the presence or absence of stored information in said storing unit corresponding to said digital signals;

said information storing unit further including an enabling signal sender which transmits in succession enabling signals unique to each inquiry unit respectively, said enabling signal when detected by the inquiry unit to which it is unique, activating such inquiry unit to enable it to transmit digital signals representing a multi digit number while the remaining inquiry units are blocked from transmitting digital signals.

2. A system as recited in claim 1 wherein said means in each unit for rotating and stopping said wheels is activated in response to the last digit of said multi digit number being inserted by depression and release of the number key for such last digit.

3. A system as recited in claim 1 wherein each said inquiry unit has indicator means thereon operated in response to the character of said reporting signal to report the presence or absence of said multi digit number stored in said storing unit.

4. A system as recited in claim 1 wherein said storing unit includes means for sending a validating code signal with said reporting signal, said validating code signal being variable at the option of a person having access to said central information storing unit, and each said inquiry unit having code display means operated upon receipt of said validating code signal to indicate at the inquiry unit the current validating code signal set at said central information storing unit.

5. A system as recited in claim 1 wherein each said inquiry unit has an indicator light connected to be illuminated when operating power is supplied to said central information storing unit to thereby represent the system in operating condition.

6. A system as recited in claim 1 wherein said central information storing unit has a control unit connected therewith for inserting into the storing unit or deleting from the storing unit information representative of a multi digit number, said control unit comprising:

a keyboard of ten number keys individually representing the digits 0 through 9 respectively;

a series of digit display wheels rotatable about a common axis with each wheel bearing the digits 0 through 9 individually spaced on the circumference of the wheel and each wheel having a normal standby position common to all said wheels;

means for rotating and stopping said wheels in representing a multi-digit number inserted into the control unit by successively depressing the appropriate number keys making up said number whereby collectively said wheels display said multidigit number; and a sending key for operating the control unit to supply to the storing unit digital signals representing the multi-digit number, operation of the control unit in response to the sending key also acting to reset the digit display wheels to the normal standby position.

7. A system as recited in claim 1 wherein said control units provided with a lock controlled disabling switch whereby use of said control unit to insert or delete information from said central information storing unit may be limited to authorized persons.

* * * * *